United States Patent [19]

Dervin

[11] Patent Number: 4,872,444
[45] Date of Patent: Oct. 10, 1989

[54] WIND DEFLECTOR SHIELD FOR WATER HEATER COMPARTMENT

[76] Inventor: Richard T. Dervin, 1302 West Anderson Dr., Phoenix, Ariz. 85023

[21] Appl. No.: 285,130

[22] Filed: Dec. 16, 1988

[51] Int. Cl.⁴ .............................................. F24H 1/00
[52] U.S. Cl. ................................... 126/361; 126/344; 126/347; 98/34.6; 237/36
[58] Field of Search .................... 126/369, 361, 307 A, 126/344, 347, 112; 98/119, 93, 44, 2.12, 2.13, 34.6; 237/36, 35; 431/310, 251, 146

[56] References Cited

U.S. PATENT DOCUMENTS

| | | | |
|---|---|---|---|
| 1,331,950 | 2/1920 | Biddle | 98/44 |
| 3,842,722 | 10/1974 | Miller | 98/119 |
| 4,393,753 | 7/1983 | Chatlos | 98/2.12 |
| 4,509,681 | 4/1985 | Kogut | 98/34.6 |
| 4,773,391 | 9/1988 | Alexander | 98/119 |

Primary Examiner—Larry Jones
Attorney, Agent, or Firm—Tod R. Nissle

[57] ABSTRACT

A wind deflector shield for the ventilation opening in the door of a water heater closet of a vehicle. The deflector shield is resiliently flexed to install the shield in the ventilation opening.

3 Claims, 1 Drawing Sheet

4,872,444 the art from the following detailed description thereof, taken in conjunction with the drawings, in which:

FIG. 1 is a perspective view illustrating a conventional recreational vehicle provided with an access door to a water heater closet in the vehicle;

FIG. 2 is a top view illustrating a sheet metal blank cut out in accordance with the method of the invention;

FIG. 3 is a top view illustrating the blank of FIG. 2 after it has been folded to form a deflector shield;

FIG. 4 is a side view illustrating the folded deflector shield of FIG. 3;

FIG. 5 is a side view illustrating the folded deflector shield of FIGS. 3 and 4;

FIG. 6 is a perspective view of the ventilation opening in the access door in the recreational vehicle of FIG. 1 with the installed deflector shield of FIGS. 3 to 5 illustrated in ghost outline; and, FIG. 7 is a section view of the ventilation opening and installed deflector shield of FIG. 6 further illustrating construction details thereof.

Briefly, in accordance with the my invention, I provide a method for deflecting flowing air from a ventilation opening in a vehicle, said method including the steps of cutting a deflector shield blank from a piece of material foldable into a substantially rigid shape, the blank including a body panel including first and second spaced apart opposing side edges each having a selected length, first and second triangular side panels each having a pair of diverging edges intersecting a third common edge, one of said diverging edges of each of said side panels being attached to said body panel along an opposite one of the pair consisting of said first and second edges, and first and second elongate feet each having a longitudinal axis and connected to the other of said diverging pair of edges of an opposite one of said side panels; folding the deflector shield blank along the first and second side edges and along each of the other of the diverging pair of edges of the first and second side panels to form a deflector shield having said triangular side panels extending outwardly from said body panel in spaced apart, resiliently deflectable, opposed relationship, and the elongate feet each extending outwardly from one of the side walls and from the area bounded by the opposed, spaced apart side panels, the feed having a normal first operative position in which the feet are spaced apart a selected distance; and, inserting the deflector shield in the ventilation opening. The ventilation opening is adjacent a gas heated water container carried in the vehicle behind the ventilation opening. The ventilation opening includes spaced apart elongate opposed top and bottom boundary edges, includes a pair of spaced apart elongate side boundary edges each interconnecting the top and bottom boundary edges, and is circumscribed by an outer surface exposed to the ambient air and by an inner surface adjacent the water container. The deflector shield is inserted in the opening by orienting the deflector shield such that the longitudinal axes of the feet are substantially parallel to one of the edge pairs comprising the top and bottom boundary edges and the side boundary edges, by resiliently inwardly squeezing the side panels an amount sufficient to inwardly displace said feet to permit said shield to be inserted through said opening to a position with said feet adjacent said inner surface, and by releasing the side panels to permit the feet to resiliently outwardly return to the first operative position to permit the feet to extend outwardly from the opening contacting the inner walls to prevent the shield from being outwardly

WIND DEFLECTOR SHIELD FOR WATER HEATER COMPARTMENT

This invention relates to methods and apparatus for preventing the pilot light of a gas heater from being extinguished by ambient winds or air currents.

More particularly, the invention relates to a method for preventing an air current from flowing through a ventilation opening in the door of a water heater closet to extinguish the pilot light of the heater.

In a further respect, the invention relates to a method for prevention an ambient air current from flowing through a ventilation opening, the method enabling an air current deflector shield to be readily installed in and removed from the ventilation opening without the use of ordinary hand tools.

In still another respect, the invention relates to a wind deflector shield installation method which requires the resilient flexure of the deflector shield during installation of the shield in a ventilation opening.

In yet another respect, the invention relates to a method for installing a wind deflector shield in a ventilation opening such that the shield both deflects ambient air currents and permits interior air to escape outwardly through the ventilation opening by flowing through a channel formed by the shield, both the ambient air and the interior air flowing in a common selected direction.

Hot water containers heated with burning gas have long been stored in closet areas in homes and in vehicles. In particularly, many recreational vehicles often include a gas heated water container carried in a closet and accessed through a closet door formed in the side of the vehicle. The access door is ordinarily provided with a ventilation opening. A screen is used to cover the opening. A long existing problem associated with the ventilation opening is that ambient wind or other air currents flow through the ventilation opening screen into the water heater closet and extinguish the pilot flame.

Accordingly, it would be highly desirable to provide a method for installing in the closet door of a vehicle a wind deflector apparatus in the ventilation opening which would enable the ready outward flow of air from inside the water heater closet through the ventilation opening and which would deflect ambient winds flowing over the ventilation opening.

Therefore, it is a principal object of the invention to provide an improved ventilation opening structure for the access door of the water heater closet in a vehicle.

Another object of the invention is to provide an improved method for installing a wind deflector shield in a ventilation opening.

A further object of the invention is to provide a ventilation opening deflector shield which both permits air to escape outwardly through the ventilation opening and deflects away from the ventilation opening ambient air which is flowing over the shield.

Still another object of the invention is to provide an improved wind deflector shield installation method which does not require the use of ordinary hand tools and can be accomplished by those having minimal manual installation and assembly skills.

BRIEF DESCRIPTION OF THE DRAWINGS

These and other, further and more specific advantages of the invention will be apparent to those skilled in pulled through the opening. The body panel and side panels of the installed shield slope outwardly away from the opening to form a channel which permits air to flow through the opening outwardly from the vehicle in a selected direction of travel, the sloped body panel deflecting away from the opening air flowing adjacent the outer surface and against the body panel in the selected direction of travel.

Turning now to the drawings, which depict the presently preferred embodiments of the invention for the purpose of illustrating the practice thereof and not by way of limitation of the scope of the invention, and in which like reference characters refer to corresponding elements throughout the several views.

Figure 1:
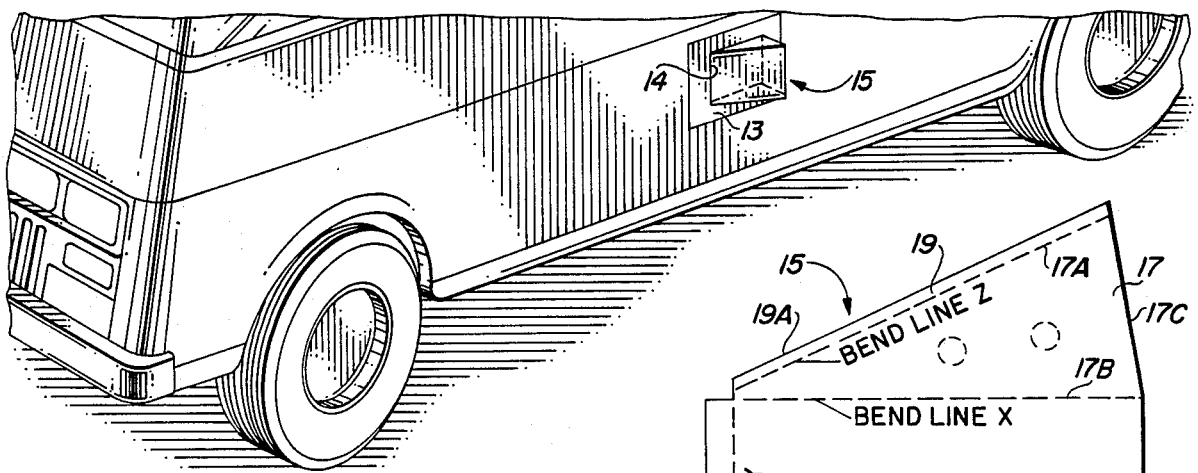
FIG. 1 illustrates a recreational vehicle 11 including a gas heated water container (not visible) stored in a closet accessed through exterior door 13. Rectangular ventilation opening 14 is formed through door 13. A screen normally covers opening 14. This screen is removed prior to utilization of the wind deflector shield of the invention.
Figure 2:
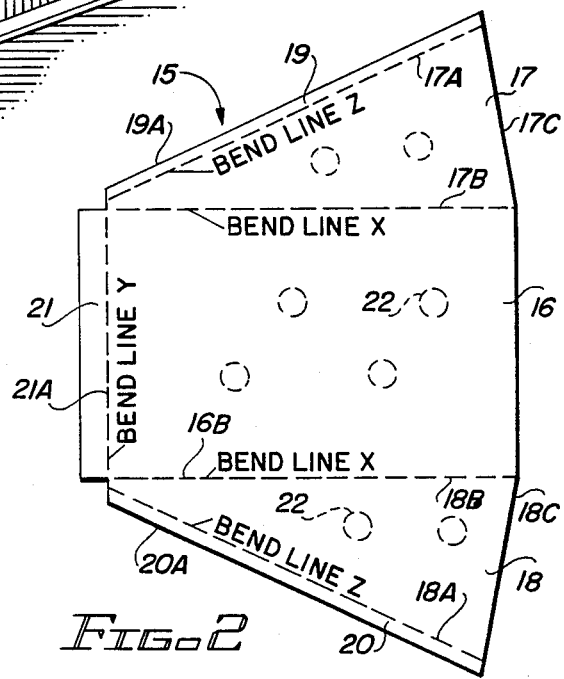

The deflector shield of the invention is folded from a thin flat blank 15. A thin piece of copper, iron, or other material which can be folded to form a substantially rigid, but pliable, deflector shield is used to form blank 15. Sheet metal of the type used to make air ducts for heating and cooling a residence is presently preferred because it is lightweight, is relatively easy to cut to form blank 15, is readily folded, and forms a deflector shield which is substantially rigid and is, at the same time, somewhat pliable and resilient. Blank 15 includes body panel 16 having opposed spaced apart, parallel side edges 16A and 16B. Triangular side panel 17 includes a pair 17A, 17B of diverging edges each intersecting a common edge 17C. Diverging edge 17B of panel 17 is connected to edge 16A of body panel 16. Triangular side panel 18 includes a pair 18A, 18B of diverging edges each intersecting a common edge 18C. Diverging edge 18B of panel 18 is connected to edge 16B of body panel 16. Elongate rectangular foot 19 is connected to diverging edge 17A of triangular panel 17. Foot 20 is connected to diverging edge 18A of triangular panel 18. Lip panel 21 is connected to body panel 16 along edge 21A of panel 21. Perforations 22 can be formed through blank 15. Blank 15 is folded along bend lines X, Y, Z to form the deflector shield of FIGS. 3 to 5. Open area or channel 80 is bounded by panels 16, 17, 18.

Figure 3:
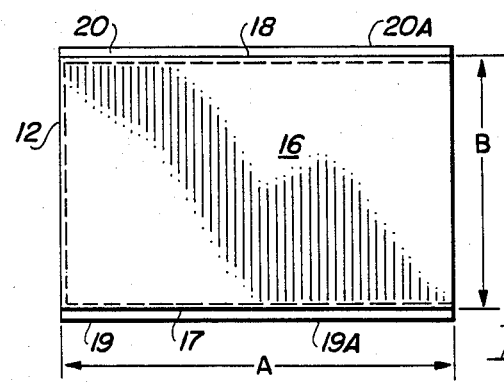
Figure 4:
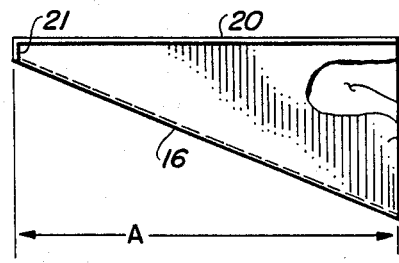
Figure 5:
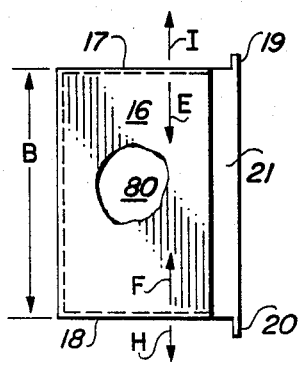

In FIGS. 3 to 5, the deflector shield folded from blank 15 is shown in its normal unstressed state. Since the distance B between the side outer surfaces of the side walls 17 and 18 is preferably slightly greater than the distance C between the top 24 and bottom 23 boundary edges of ventilation opening 14, walls 17 and 18 are manually inwardly flexed in the directions indicated by arrows E and F in FIG. 5 to insert the deflector shield in opening 14. The deflector shield of FIG. 3 can be inserted in opening 14 from the "outside-in" or from the "inside-out". To insert the shield from the outside-in, the shield is oriented with the longitudinal axes of feet 19 and 20 parallel to top 24 and bottom 23 boundary edges and adjacent outer surface 25 of access door 13. Feet 19 and 20 are intermediate body panel 16 and surface 25. Side panels 17 and 18 are inwardly flexed such that the distance between the elongate outer edges 19A and 20A of feet 19 and 20 is less than the distance C (FIG. 6) between parallel top and bottom boundary edges 24, 23. After side panels 17, 18 are so flexed, panels 17 and 18 are inserted through opening 14 in the direction indicated by arrow G until feet 19 and 20 have passed through opening 14 and are adjacent the inner surface 26 circumscribing opening 14. The compression on side panels 17 and 18 is released and side panels 17 and 18 resiliently outwardly move in the directions indicated by arrows I and H (FIG. 5). The deflector shield is preferably shaped and dimensioned such that when side panels are released and resiliently move in the direction of arrows H and I, the panels cannot completely return to the unstressed position illustrated in FIG. 5. Instead, side panels 17 and 18 continuously resiliently outwardly bear against the top and bottom boundary edges 24 and 23 as indicated by arrows J and K in FIG. 7. These outward resilient flexure forces J and K assist in maintaining the deflector shield in position in ventilation opening 14. As illustrated in FIG. 7, feet 19 and 20 contact inner surface 26 and extend outwardly from opening 14 when the deflector shield of the invention is installed in ventilation opening 14.

When the deflector shield is installed in opening 14 "inside-out", the shield is again oriented with the longitudinal axes of feet 19 and 20 parallel to top 24 and bottom 23 boundary edges. The feet 19 and 20 are, however, on the inner surface 26 side of access door 13 and body panel 16 is intermediate feet 19, 20 and inner surface 26. Panels 17 and 18 are inwardly flexed such that the distance B between the outer surfaces of panels 17 and 18 is slightly less than the distance C (FIG. 6) between parallel top and bottom boundary edges 24, 23. After side panels 17 and 18 are so flexed, panel 17 and 18 and body panel 16 are inserted through opening 14 in the direction indicated by arrow L in FIG. 7 until feet 19 and 20 contact inner surface 26. The inward flexure compression on side panels 17 and 18 is released and panels 17 and 18 resiliently outwardly move in the direction indicated by arrows I and H in FIG. 5. When the deflector shield of the invention is installed "inside-out", access door 13 is first opened so that the water container 30 will not prevent installation of the deflector shield.

In FIG. 7, cylindrical water heater 30 is immediately adjacent the inner surface 26 circumscribing opening 14. As a result, when access door 13 is closed, the outer cylindrical surface of heater 30 bears against a portion of feet 19 and 20 and presses feet 19 and 20 against surface 26 to assist in maintaining the deflector shield in position in opening 14.

Figure 6:
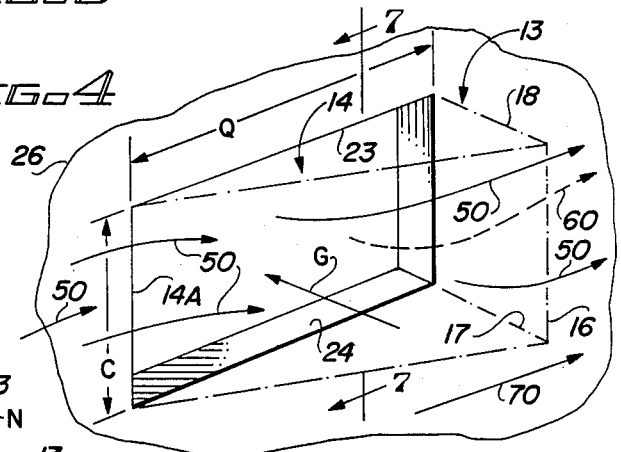
Figure 7:
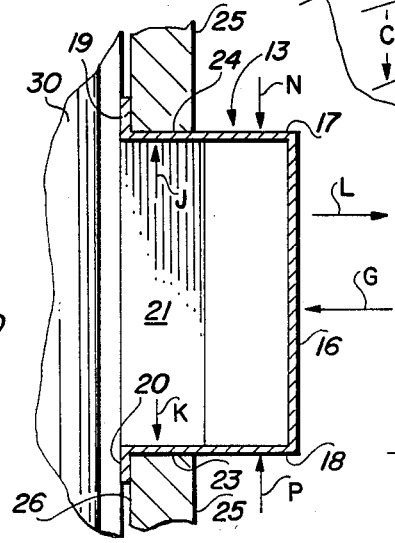

The flow of ambient air over outer surface 25 and body panel 16 of the deflector shield is illustrated in FIG. 6 by arrows 50. Dashed arrow 60 illustrates the outward flow of air from inside the closet which houses the water container 30. Body panel 16 and side panels 17 and 18 form a channel directing air flow outwardly from the water container closet area. Air 60 existing the water container closet through the deflector shield channel and air 50 deflected by body panel can flow in the same general direction of travel indicated by arrow 70.

The overall length of the deflector shield is indicated by arrow A in FIGS. 3 and 4. Length A is preferably slightly less than the distance Q between opposed, parallel, side boundary edges 14A and 14B of opening 14.

In FIG. 7, the water container 30 is, for purpose of clarity, drawn not contacting feet 19 and 20. As earlier noted, heater 30 can directly contact and force feet 19 and 20 against inner surface 26 of access door 13.

Having described my invention in such terms as to enable those skilled in the art to understand and practice it, and having identified the presently preferred embodiments thereof, I claim:

1. In combination with a ventilation opening formed through an exterior access door to a closet in a vehicle housing a gas heated water container, the ventilation opening
   including spaced apart elongate opposed top and bottom boundary edges,
   including a pair of spaced apart elongate side boundary edges each interconnecting said top and bottom boundary edges,
   being circumscribed by an outer surface exposed to the ambient air and by an inner surface adjacent said water container,
a deflector shield folded from a blank including
   (a) a body panel including first and second spaced apart opposing side edges;
   (b) first and second triangular side panels each having a pair of diverging edges intersecting a third common edge, one of said diverging edges of each of said side panels being attached to said body panel along an opposite one of the pair consisting of said first and second edges; and,
   (c) first and second elongate feet each having a longitudinal axis and connected to the other of said diverging pair of edges of an opposite one of said side panels;
said blank being folded along said first and second side edges and along the other of said diverging pair of edges of each of said first and second side panels to form said deflector shield, said shield including
   (d) said triangular side panels extending outwardly from said body panel in spaced apart, opposed relationship, and
   (e) said elongate feet each extending outwardly from one of said side panels and from the area bounded by said opposed, spaced apart side panels, said feet extending outwardly from said opening and contacting said inner wall to prevent said shield from being outwardly pulled through said opening,
said side panels extending outwardly through said opening to said body panel,
said body panel and said one of said diverging pair of edges of each of said side panels of said shield sloping outwardly away from said opening to form a channel which permits air to flow through said opening outwardly from said vehicle in a selected direction of travel, said sloped body panel deflecting away from said opening air flowing adjacent said outer surface and against said body panel in said selected direction of travel.

2. A method for deflecting flowing air from a ventilation opening in a vehicle, said method including the steps of
   (a) cutting a deflector shield blank from a piece of material foldable into a substantially rigid shape, said blank including
      (i) a body panel including first and second spaced apart opposing side edges each having a selected length,
      (ii) first and second triangular side panels each having a pair of diverging edges intersecting a third common edge, one of said diverging edges of each of said side panels being attached to said body panel along an opposite one of the pair consisting of said first and second edges, and
      (iii) first and second elongate feet each having a longitudinal axis and connected to the other of said diverging pair of edges of an opposite one of said side panels;
   (b) folding said deflector shield blank along said first and second side edges and along the other of said diverging pair of edges of each of said first and second side panels to form a deflector shield having
      (i) said triangular side panels extending outwardly from said body panel in spaced apart, opposed relationship and
      (ii) said elongate feet each extending outwardly from one of said side panels and from the area bounded by said opposed, spaced apart side panels, said feet having a normal first operative position in which said feet are spaced apart a selected distance;
   (c) inserting said deflector shield in said ventilation opening, said opening being adjacent a gas heater water container carried in said vehicle behind said ventilation opening, said opening
      (i) including spaced apart elongate opposed top and bottom boundary edges,
      (ii) including a pair of spaced apart elongate side boundary edges each interconnecting said top and bottom boundary edges,
      (iii) being circumscribed by an outer surface exposed to the ambient air and by an inner surface adjacent said water container,
   said deflector shield being inserted in said opening by
      (iv) orienting said deflector shield such that the longitudinal axes of said feet are substantially parallel to one of the edge pairs in the class consisting of
         a first edge pair including said top and bottom boundary edges, and
         a second edge pair including said side boundary edges,
      (v) resiliently inwardly squeezing said side panels an amount sufficient to inwardly displace said feet to permit said shield to be inserted through said opening to a position with said feet adjacent said inner surface,
      (vi) releasing said side panels to permit said feet to resiliently outwardly return to said first operative position to permit said feet to extend outwardly from said opening contacting said inner wall to prevent said shield from being outwardly pulled through said opening,
said body panel and said one of said diverging pair of edges of each of said side panels of said installed shield sloping outwardly away from said opening to form a channel which permits air to flow through said opening outwardly from said vehicle in a selected direction of travel, said sloped body panel deflecting away from said opening air flowing adjacent said outer surface and against said body panel in said selected direction of travel.

3. The method of claim 2, wherein said water container is immediately adjacent said inner surface circumscribing said opening and at least a portion of at least one of said feet contacts and is between said water container and said inner surface.

* * * * *